United States Patent [19]

Reid

[11] Patent Number: 5,560,542
[45] Date of Patent: Oct. 1, 1996

[54] PORTABLE ABOVE GROUND WATER MANIFOLD AND SYSTEM FOR ESTABLISHING A NEW LAWN

[76] Inventor: Randy C. Reid, 26188 Levi Waite Rd., Round Lake, Ill. 60073

[21] Appl. No.: 340,044

[22] Filed: Nov. 14, 1994

[51] Int. Cl.$^6$ .......................... B05B 12/04; A01G 25/16
[52] U.S. Cl. .......................... 239/70; 239/276; 239/536; 239/DIG. 15
[58] Field of Search .................. 239/67, 70, 273, 239/276, 536, 556, 557, 548, DIG.15; 137/883, 624.2

[56] References Cited

U.S. PATENT DOCUMENTS

| | | | |
|---|---|---|---|
| 3,118,606 | 1/1964 | Rotunda | 239/70 X |
| 3,578,245 | 5/1971 | Brock | 239/66 |
| 3,599,867 | 8/1971 | Griswold et al. | 239/63 |
| 3,911,955 | 10/1975 | Link | 239/70 X |
| 4,014,359 | 3/1977 | Sanner | 137/78 |
| 4,092,505 | 5/1978 | Caviar | 239/70 X |
| 4,232,707 | 11/1980 | Sturman et al. | 239/70 X |
| 4,241,375 | 12/1980 | Ruggles | 361/166 |
| 4,569,020 | 2/1986 | Snoddy et al. | 239/69 X |
| 4,708,162 | 11/1987 | Bayat | 137/382 |
| 4,722,478 | 2/1988 | Fletcher et al. | 239/69 |
| 4,791,948 | 12/1988 | Bayat | 137/1 |
| 4,819,877 | 4/1989 | Ciccolallo et al. | 239/276 X |
| 4,858,827 | 8/1989 | Fletcher et al. | 239/69 |
| 4,934,400 | 6/1990 | Cuming | 137/78.3 |
| 5,020,722 | 6/1991 | Wardell | 239/1 |
| 5,021,939 | 6/1991 | Pulgiese | 239/67 X |
| 5,038,268 | 8/1991 | Krause et al. | 239/70 X |
| 5,048,755 | 9/1991 | Dodds | 239/64 |
| 5,082,022 | 1/1992 | Boundy | 137/624.12 |
| 5,097,861 | 3/1992 | Hopkins et al. | 137/78.3 |
| 5,100,056 | 3/1992 | Theodorsen et al. | 239/63 |
| 5,287,888 | 2/1994 | Geiger | 137/624.2 |

FOREIGN PATENT DOCUMENTS

2636205  3/1990  France ............. 239/70

Primary Examiner—Lesley D. Morris
Attorney, Agent, or Firm—Charles F. Meroni, Jr.

[57] ABSTRACT

A portable knockdown above ground watering system and method for establishing a new lawn is provided. The system includes a compact water manifold structure comprising a manifold housing having a water inlet in fluid communication with a plurality of water outlets. A plurality of solenoid actuated valves are connected adjacent to and in fluid communication with each of the water outlets. The solenoid actuated valves being electrically connected to a control cable plug. An inlet hose connector is connected in fluid communication with the water inlet for removable connection to an inlet hose. A plurality of sprinkler heads are connected in fluid communication to the manifold structure with removably connected outlet hoses. A flexible waterproof control cable is provided. The control cable is removably connected between the control cable plug and a timer assembly which is used for electronically regulating the solenoid actuated valves for operation of the sprinkler heads.

14 Claims, 6 Drawing Sheets

PORTABLE ABOVE GROUND WATER MANIFOLD AND SYSTEM FOR ESTABLISHING A NEW LAWN

BACKGROUND OF THE INVENTION

1. Field of the Invention

The present invention relates generally to a method and system for watering a lawn. More particularly, the invention pertains to a portable knockdown above ground water manifold, watering system, and method for establishing the growth of a new lawn.

2. Description of the Prior Art

Various types of watering systems and devices are known in the art. Maintenance of a healthy lawn or yard requires sufficient amounts of water to be properly distributed. Most existing watering systems tend to fall into two general categories, in ground or buried watering systems and above ground watering systems.

In ground watering systems generally involve buried water supply lines and a number of permanently located sprinkler heads. Timers and control systems are used to operate these systems to provide for various types of watering parameters. For example, U.S. Pat. No. 5,097,861, issued to Hopkins et al., discloses an in ground irrigation method and control system for watering a plurality of watering stations spaced about a lawn or garden. U.S. Pat. No. 3,578,245, issued to Brock, discloses an in ground watering system having a plurality of buried valves which actuate pop up sprinklers. While in ground systems do provide a satisfactory means for watering a lawn, they suffer from a number of disadvantages. For example, they are expensive to install, they can suffer from high frequency of repairs in climates where the buried lines are susceptible to freezing and cracking, and their permanence can adversely affect a homeowners future plans for landscaping or other building modifications.

Above ground watering systems and devices do not suffer from the disadvantages seen with in ground systems. Most above ground systems typically involve a garden hose connected to a water sprinkling device which is positioned at a particular location. For example, many styles of oscillating or rotating sprinklers are known in the art. One of the most significant disadvantages of above ground systems involves the amount of responsibility placed on the user to have to move the devices to different locations and to remember to turn on and off the water which supplies the devices.

In the establishment of a new lawn whether the lawn is seeded or sodded, the requirement for repetitive amounts of watering is very important. If a lawn is seeded, the germination times for most blends of grass will fall in the range of three to twenty-one days, with annual rye grass seed at the three day range and bluegrasses in the fourteen to twenty-one day range. If a lawn is sodded, the need exists for the sod to grow new roots. During this time period, which is usually the first three weeks, it is imperative that the entire new lawn is repetitively supplied with sufficient amounts of water or the sod or seed will fail.

In new home and commercial construction, landscaping and the establishment of a healthy lawn plays an important role in both sales and the potential liability of the contractor or individual responsible for laying down the initial sodding or seeding. Existing in ground and above ground watering systems fail to provide an inexpensive and reliable watering system for the establishment of a new lawn. Therefore, the need exists for an inexpensive portable above ground watering system that can aid in the establishment of a new lawn during this critical time period.

As will be described in greater detail hereinafter, the above ground watering system and method of the present invention differs from those previously proposed.

SUMMARY OF THE INVENTION

Accordingly, it is an object of this invention to provide a portable above ground watering system and method for establishing a new lawn.

Another object of this invention is to provide a watering system having a knockdown design for compact storage and transportation.

Still another object of this invention is to provide an inexpensive watering system capable of automatic twenty-four hour a day operation during the establishment of a new lawn.

Yet another object of this invention is to provide a compact water manifold structure for use in an above ground watering system, the manifold structure having a low profile for inconspicuous ground level placement out in the lawn, which will reduce the lengths of hoses needed to connect from the manifold structure to the sprinkler heads.

Yet still another object of this invention is to provide a portable above ground watering system that is expandable and does not require the placement or use of extending high voltage wire or extension cords across a lawn or yard for increased safety.

To achieve the foregoing and other objectives, and in accordance with the purposes of the present invention a portable knockdown above ground watering system for establishing a new lawn is provided. The system includes a compact water manifold structure comprising a manifold housing having a water inlet in fluid communication with a plurality of water outlets. A plurality of solenoid actuated valves are connected adjacent to and in fluid communication with each of the water outlets, each solenoid actuated valve having a solenoid valve water outlet having threaded means for removable engagement with a first end of an outlet hose. The solenoid actuated valves being electrically connected to a first control cable plug. An inlet hose connector is connected in fluid communication with the water inlet for removable connection to an inlet hose. The inlet hose being removably connected to a water source. A plurality of sprinkler heads are provided. Each sprinkler head being removably connected to a second end of the outlet hose. A flexible waterproof control cable having a first mated socket end and a second mated socket end is provided. The first mated socket end being in removable watertight mated engagement with a socket end of the first control cable plug. A timer assembly is provided for electronically regulating the solenoid actuated valves for operation of the sprinkler heads. The timer assembly being electrically connected to a timer control cable plug, the timer control cable plug having a timer socket end for removable watertight mated engagement with the second mated socket end of the flexible waterproof control cable.

In accordance with an aspect of the invention, a portable compact low profile water manifold structure for use with an above ground portable watering system is provided. The manifold structure comprises a pair of mated mold structures positioned on top of one another with the mated mold structures including a main tubular trunk with an inlet end and a series of tubular branches longitudinally spaced along the main trunk and angled in staggered relation away from the main trunk. The tubular branches having outlet ends. A series of solenoid actuated valves are positioned in fluid connection with the outlet ends. Connector means for removably electrically connecting the solenoid actuated valves to a timer assembly is provided.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
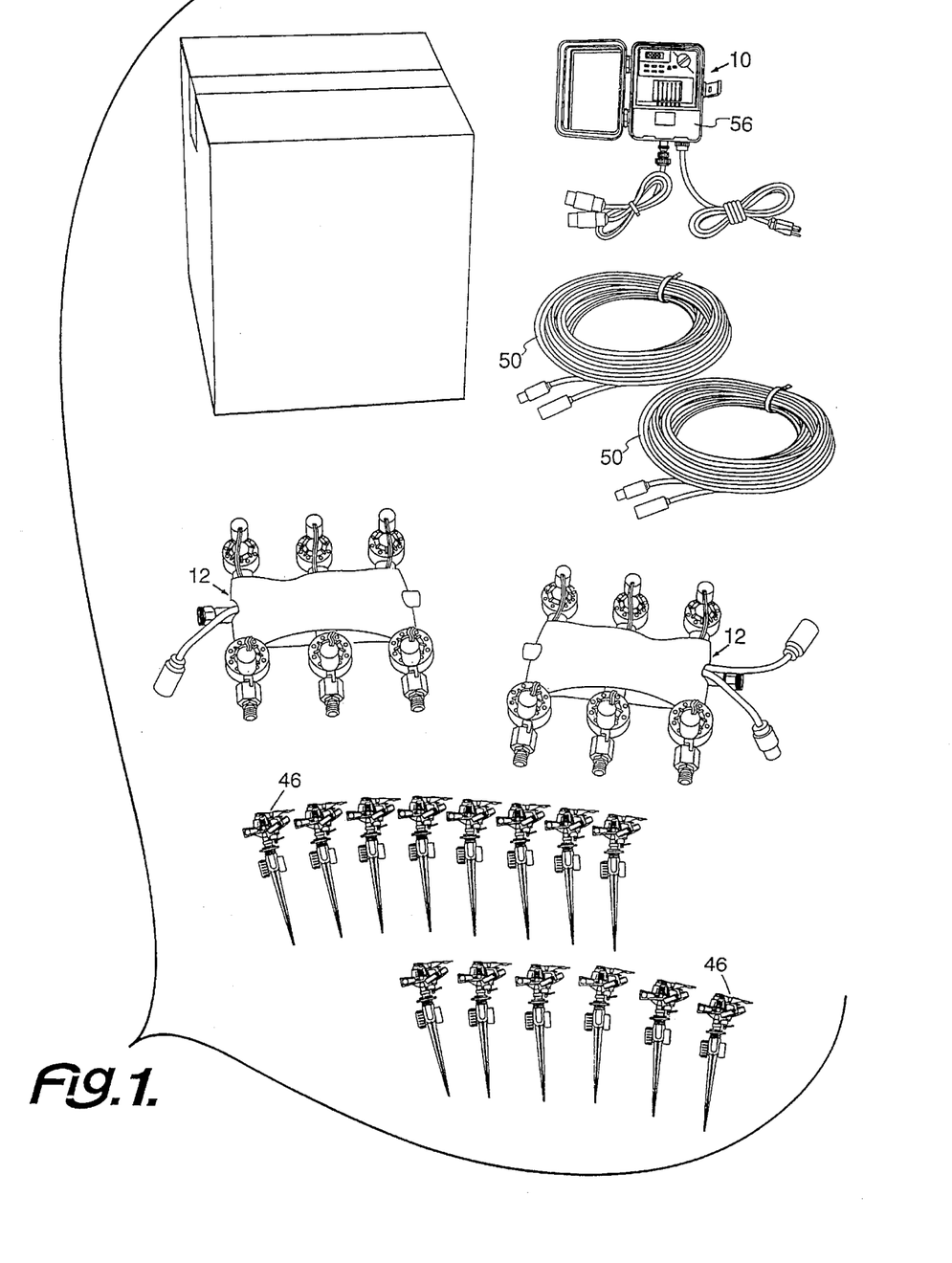
FIG. 1 is a perspective view of the watering system of the present invention showing the system in a disassembled knockdown configuration for compact storage and transportation within a box.
Figure 2:
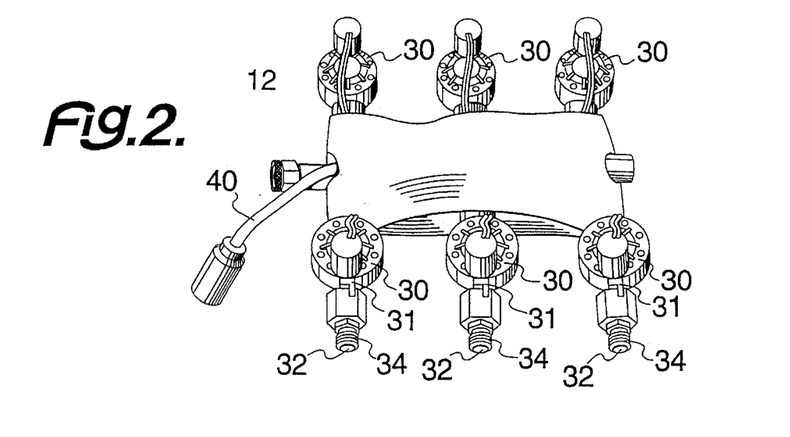
FIG. 2 is a perspective view of a one embodiment of a compact water manifold structure of the present invention.
Figure 3:
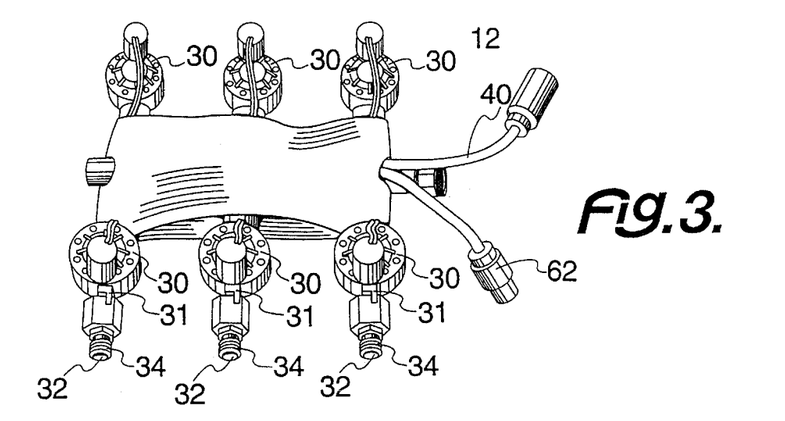
FIG. 3 is a perspective view of another embodiment of a compact water manifold structure of the present invention.

Referring now to the drawings, FIG. 1 illustrates a portable knockdown above ground watering system 10 for establishing a new lawn. The system 10 is shown in a disassembled knockdown configuration for compact storage and transportation within a box.

Figure 4:
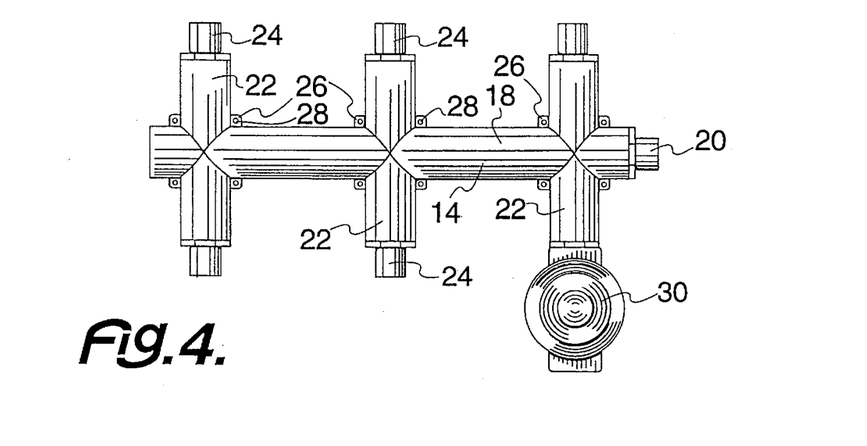
FIG. 4 is a top plan view of a manifold housing of the manifold structure of FIGS. 2 and 3.
Figure 5:
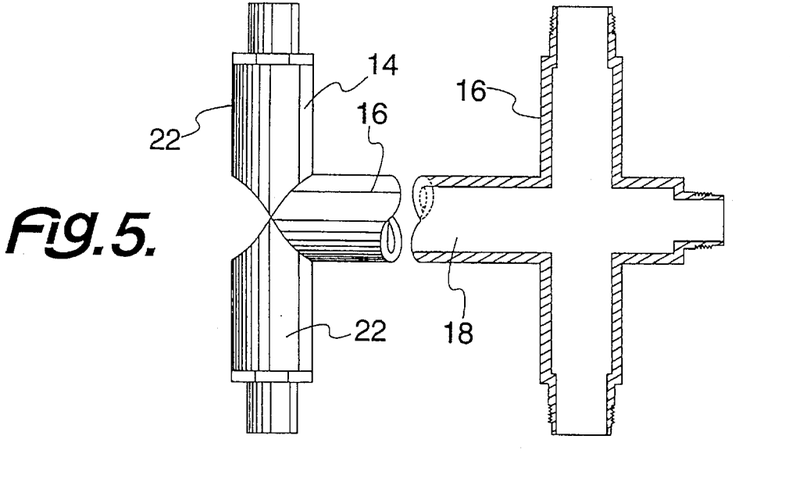
FIG. 5 is a partial sectional view of the manifold housing of FIG. 4.
Figure 6:
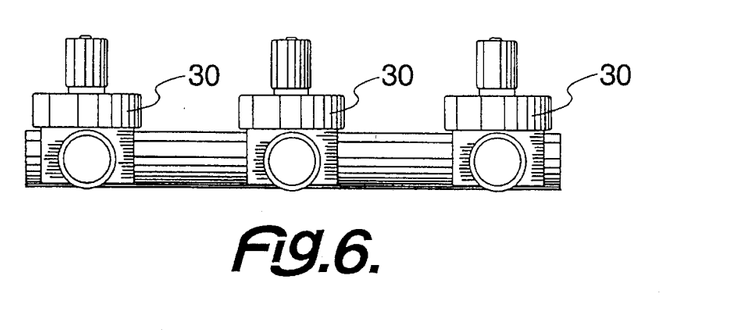
FIG. 6 is a side view of the compact water manifold structure with attached solenoid actuated valves.

The system 10 includes a compact water manifold structure 12 comprised of a manifold housing 14. As best illustrated in FIGS. 4 and 5, the housing 14 is preferably formed from a pair of mated mold structures 16 formed of synthetic plastic material. The mold structures 16 being positioned on top of one another with the mated mold structures 16 including a main tubular trunk 18 with a water inlet end or water inlet 20 and a series of tubular branches 22 longitudinally spaced along the main trunk 18 and angled in staggered relation away from the main trunk 18. The tubular branches 22 have outlet ends or water outlets 24. The mated mold structures are connected to one another by adhesive, such as epoxy, PVC glue or any other suitable adhesive.

Each mated mold structure 16 has a plurality of web portions or gussets 26 in corresponding overlapping adjacency with the gussets 26 of the other mated mold structure. The gussets having an aperture 28 for securement of a fastening means, such as a screw or bolt, therethrough.

The water inlet 20 is in fluid communication with a plurality of water outlets 24. Preferably, six water outlets are provided. A plurality of solenoid actuated valves 30 are connected adjacent to and in fluid communication with each of the water outlets 24. Preferably, the solenoid actuated valves 30 are universal 24 volt solenoid valves of conventional design, such as the "WaterMaster" valve, model number 57041, made by Orbit Sprinklers of Bountiful, Utah.

The solenoid actuated valve 30 has a manual lever 31 for manual operation of the valve. Each solenoid actuated valve 30 has a solenoid valve water outlet 32 having threaded means or a threaded portion 34 for removable engagement with a first end 36 of an outlet hose 38. The solenoid actuated valves 30 for each manifold structure are electrically connected to a pigtail or first control cable plug 40. An inlet hose connector 42 is connected in fluid communication with the water inlet 20 for removable connection to an inlet hose 44. The inlet hose 44 is removably connected to a water source, such as an outside water valve of a building. Preferably, the outlet hoses 38 or inlet hoses 44 are garden hoses of conventional design.

Figure 8:
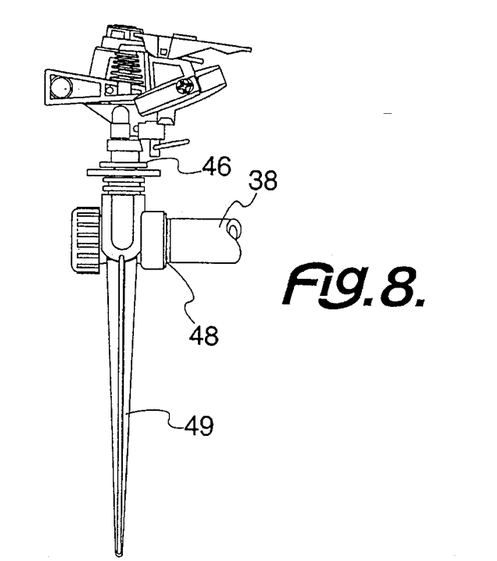
FIG. 8 is a perspective view a sprinkler assembly of the present invention.
Figure 9:
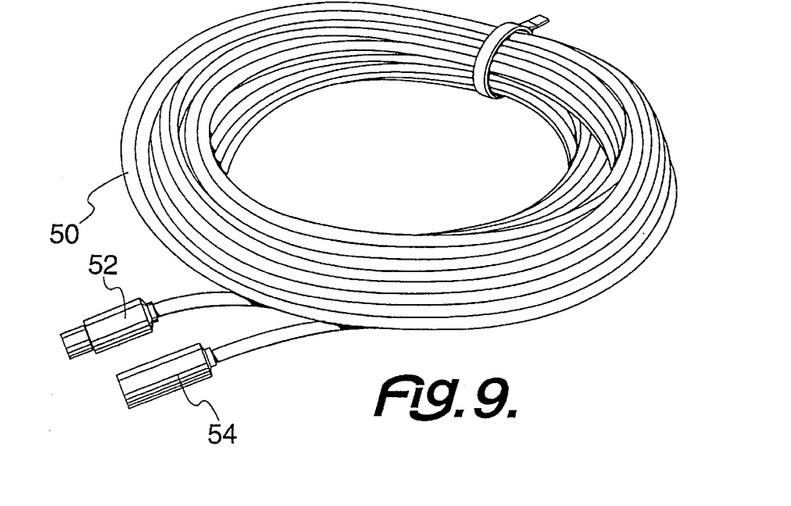
FIG. 9 is a perspective view of control cables of the present invention.
Figure 10:
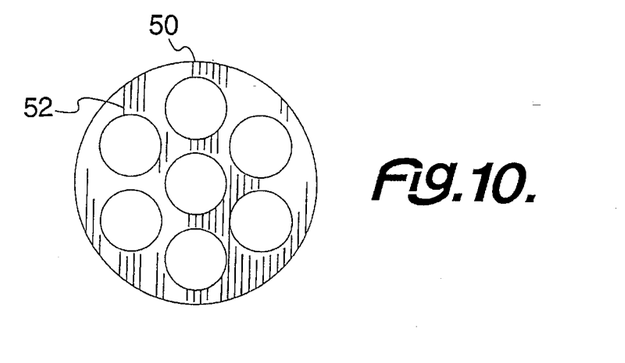
FIG. 10 is an end view of a male socket end of the control cable of FIG. 9.

A plurality of sprinkler assemblies or sprinkler heads 46 are provided. Each sprinkler head 46 is removably connected to a second end 48 of the outlet hose 38. Any number of possible sprinkler assemblies may be used by this system. For example, oscillating or rotating sprinklers, impact sprinkler heads, and soaker hoses may be used. Preferably, sprinkler head 46 is an impact sprinkler head having an elongated spike 49 for removable securement into the new lawn. The sprinkler head 46 is preferably formed of a plastic or non-corrosive material and has adjustments for adjusting the distance of water, the degree of spray, and level of mist, such as the spike sprinkler, model number 58167, made by Orbit Sprinklers of Bountiful, Utah.

Figures 11, 12:
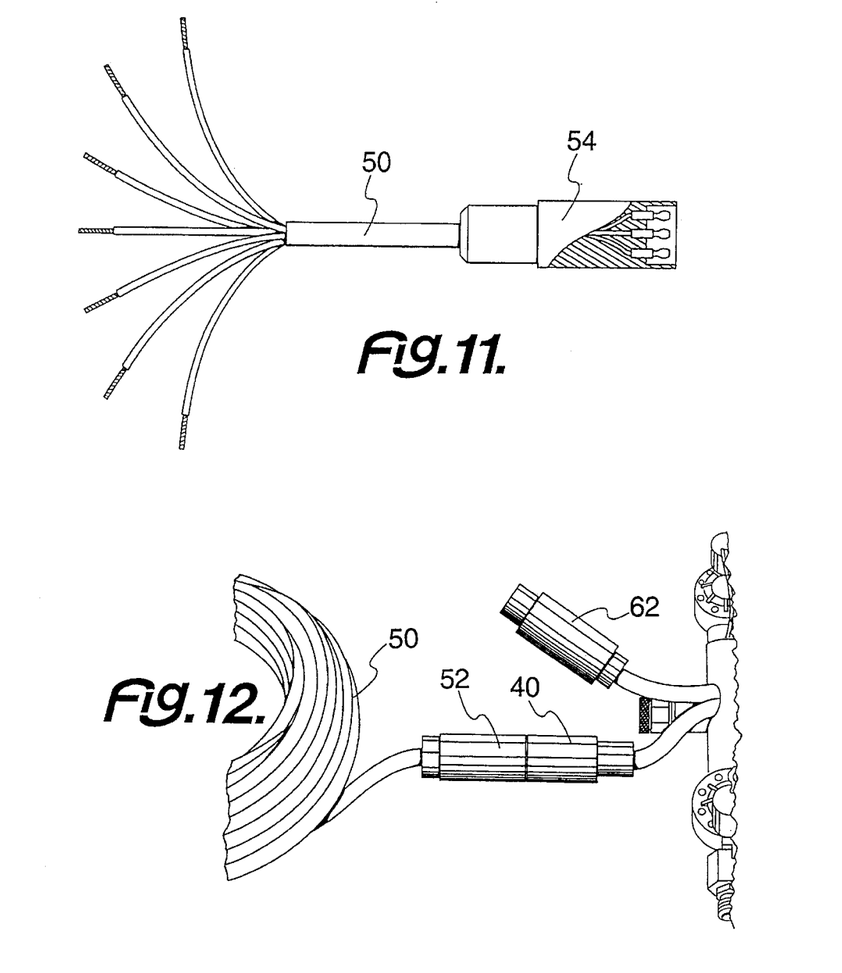
FIG. 11 is a partial side view of a female socket end of the control cable of FIG. 9.
FIG. 12 is a partial perspective view of the control cable in mated engagement with a control cable plug of a manifold structure.
Figure 13:
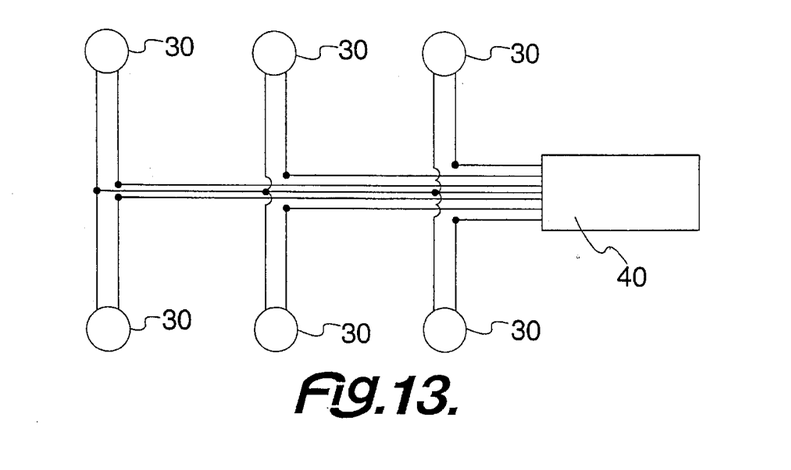
FIG. 13 is a wiring diagram of a manifold structure of the present invention.
Figure 14:
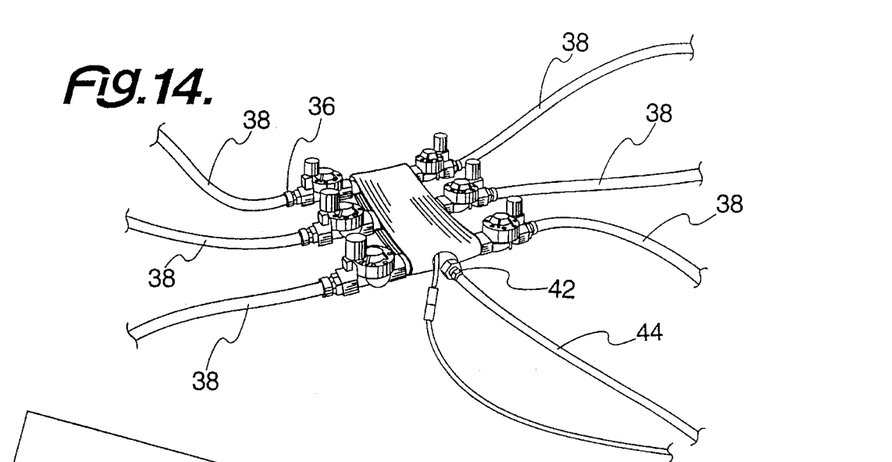
FIG. 14 is a perspective view of a manifold structure connected to an inlet hose and a plurality of outlet hoses.

Specially designed flexible waterproof control cables 50 are provided. As shown in FIGS. 9–12, the control cables 50 have a first mated socket end 52 and a second mated socket end 54. Preferably, the first mated socket end 52 is a male type socket and the second mated socket end 54 is a female type socket. The control cables are formed of multi-stranded wires having a vinyl insulation outer casing. The first mated socket end 52 and a second mated socket end are preferably molded integral with the control cable 50. The first mated socket end being in removable watertight mated engagement with a socket end of the first control cable plug, as shown in FIG. 12. It has been found that a seven conductor control cable works well. A wiring diagram of the first control cable plug is shown in FIG. 13. It has been found that lengths of control cables of fifty and hundred feet work especially well with this system.

Figure 7:
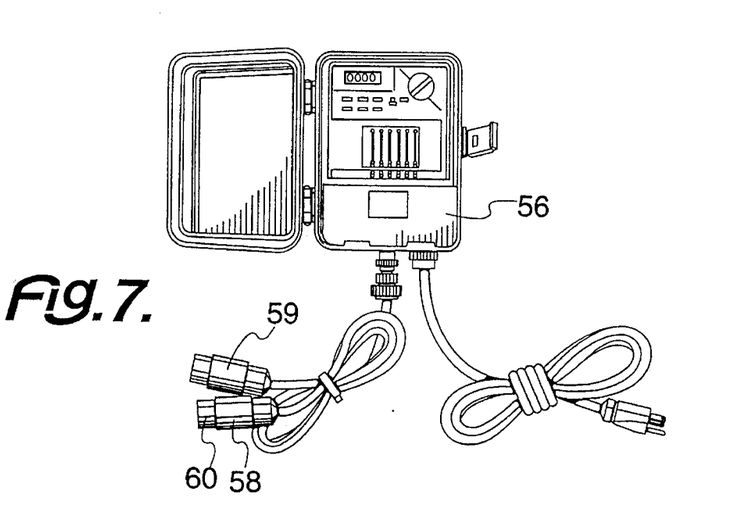
FIG. 7 is a perspective view of a timer assembly of the present invention.

As best illustrated in FIG. 7, a timer means or timer assembly 56 is provided for electronically regulating the solenoid actuated valves for operation of the sprinkler heads 46. The timer assembly being electrically connected to a timer control cable plug 58. The timer control cable plug 58 having a timer socket end 60 for removable watertight mated engagement with the second mated socket end 54 of the flexible waterproof control cable 50. A second timer control cable plug 59 is electrically connected to the timer assembly for the connection of an additional control cable. A 120 volt supply line of the timer assembly 56 is electrically connected to a power source. The timer assembly 56 being in approximate adjacency, such as within ten feet or the length of the supply line, to the power source so that high voltage is disposed away from the new lawn. The timer means having a 24 volt output for low voltage above ground electrical passage along the flexible waterproof control cables 50. Preferably, the timer assembly is housed within a waterproof lockable box. It is been found that a six zone, four cycle per day, fourteen day clock style of electric timer assembly works well. An example of such a timer assembly is made by Orbit Sprinkler, model no. 57606. It is to be understood that other styles of timer assemblies of conventional design may also be utilized with the system 10.

It has been found that seed or sod should be watered approximately one hour per day, with additional watering needed during times of drought. Using a four cycle timer, this will require the watering of a particular watering zone for periods of at least fifteen minute increments.

In a method for establishing a new lawn with an above ground system, the method comprises the steps of: determining a number of watering zones within an area that the new lawn is to be established, the area of the watering zones being determined by the area of watering covered by a single sprinkler assembly; determining a number of available water supply lines for watering of the lawn; providing a number of compact water manifold structures and timer assemblies that will be required to supply water to the sprinkler assembly of each watering zone so that each watering zone may be watered a required amount per day with only one watering zone being watered off of one water supply line at a given time so that there is sufficient water pressure to fully operate the sprinkler assembly; and arranging the compact water manifold structures on the new lawn so that a minimum length of outlet hoses may be removably connected between the compact manifold structures and the sprinkler assembly of each watering zone.

The method may also comprise the step of positioning each timer assembly in approximate adjacency to a power source of the timer assembly so that high voltage is disposed away from the new lawn, each timer assembly having a low voltage output for above ground electrical passage along flexible waterproof control cables. This is an important feature because the extension of high voltage lines across a lawn poses various safety risks.

The step of providing a number of compact water manifold structures is preferably based upon each manifold structure being capable of supplying water to six separate watering zones. It has been found that manifold structures having less than six water outlets were unable to provide enough watering zones to cover the area they were extended to. Manifold structures having more than six water outlets were found to have too many water outlets for the number of watering zones needed. However, it is to be understood that changes in the type of timer assembly 56 used may make a different number of water outlets more desirable.

After the establishment of lawn is completed, which is usually around the time period of three weeks, the additional step may be completed of disassembling the watering system for compact storage within a box for transporting to a new location.

An important feature of this system involves the expandability of the system 10 to provide watering for areas of different sizes. The following chart provides different configurations of the number of components needed for a system to water areas of varied sizes and having different numbers of available water supply lines:

| Supply Lines: | Manifold Structure: | Timer assemblies: | Area (in square feet): |
| --- | --- | --- | --- |
| 1 | 1 | 1 | 0–10,000 |
| 1 | 2 | 2 | 10,000–20,000 |
| 1 | 3 | 3 | 15,000–30,000 |
| 1 | 4 | 4 | 20,000–40,000 |
| 2 | 2 | 1 | 10,000–20,000 |
| 2 | 3 | 2 | 15,000–30,000 |
| 2 | 4 | 2 | 20,000–40,000 |
| 2 | 5 | 3 | 25,000–50,000 |
| 2 | 6 | 4 | 30,000–60,000 |
| 3 | 3 | 1 | 15,000–30,000 |
| 3 | 4 | 2 | 20,000–40,000 |

Figure 15:
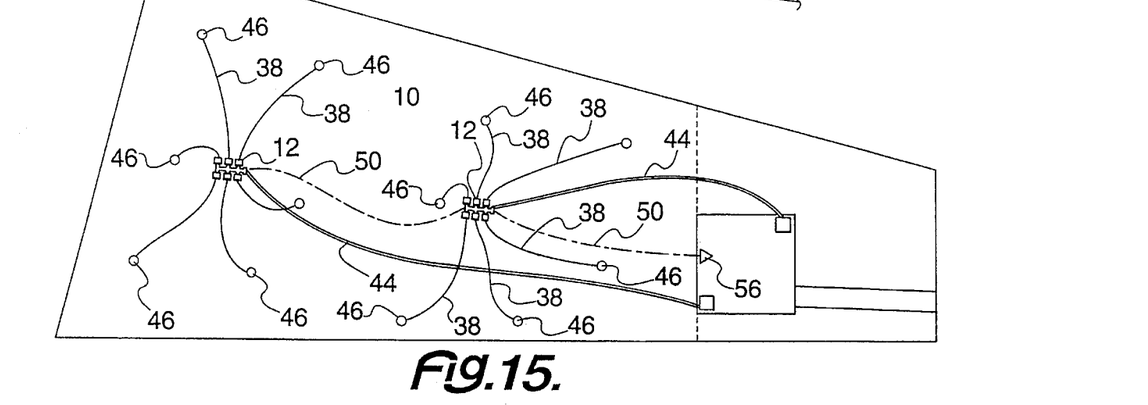
FIG. 15 is a top plan view of one configuration of the watering system.
Figure 16:
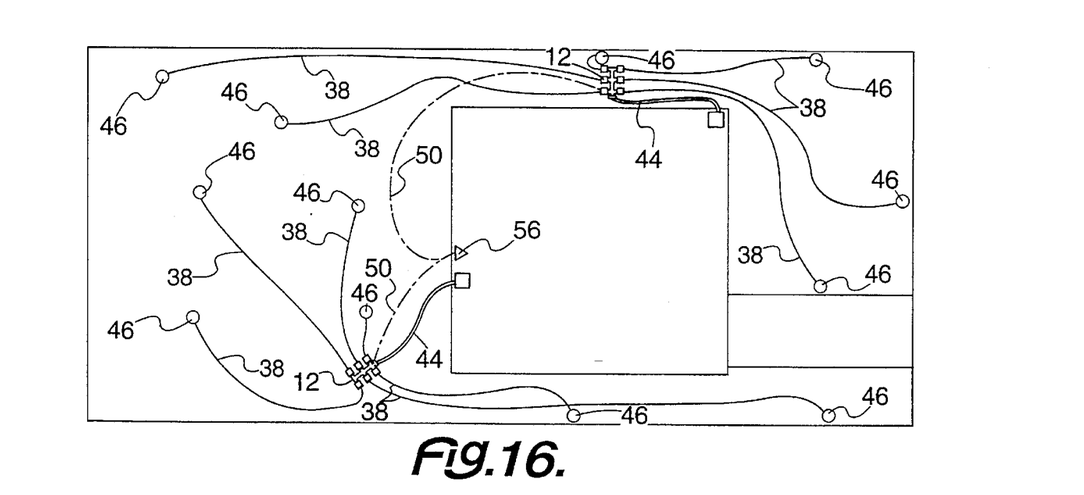
FIG. 16 is a top plan view of another configuration of the watering system.

In utilizing an expanded system, it is often necessary to use the compact manifold structure 12 having a second control cable plug 62 electrically connected to the first control cable plug 40, as shown in FIG. 5. A second or additional flexible waterproof control cable 50 is provided. The first mated socket end of this second flexible waterproof control cable being in removable watertight mated engagement with a socket end of the second control cable plug 62. A second or additional compact water manifold is then removably connected to this second flexible waterproof control cable. Therefore, a single timer 56 assembly will operate corresponding solenoid actuated valves 30 on two separate manifold structures 12 connected in series. An example of a system configuration using two interconnected manifold structures is shown in FIG. 15. The configuration shown in FIG. 16 illustrates the use of two manifold structures separately connected to a single timer assembly. It is to be appreciated that numerous combinations of manifold structures 12 and timer assemblies 56 along with interconnecting control cables 50 may be arranged for watering lawns of varied sizes.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A portable knockdown above ground watering system for establishing a new lawn, comprising in combination:

(a) a compact water manifold structure comprising a manifold housing having a water inlet in fluid communication with a plurality of water outlets, a plurality of solenoid actuated valves connected adjacent to and in fluid communication with each of the water outlets, each solenoid actuated valve having a solenoid valve water outlet having threaded means for removable engagement with a first end of an outlet hose, the solenoid actuated valves being electrically connected to a first control cable plug, and an inlet hose connector connected in fluid communication with the water inlet for removable connection to an inlet hose, the inlet hose being removably connected to a water source;

(b) a plurality of sprinkler heads, each sprinkler head being removably connected to a second end of the outlet hose;

(c) a flexible waterproof control cable having a first mated socket end and a second mated socket end, the first mated socket end being in removable watertight mated engagement with a socket end of the first control cable plug; and (d) timer means for electronically regulating the solenoid actuated valves for operation of the sprinkler heads, the timer means being electrically connected to a timer control cable plug, the timer control cable plug having a timer socket end for removable watertight mated engagement with the second mated socket end of the flexible waterproof control cable.

2. The combination of claim 1, further comprising:

(a) a second control cable plug electrically connected to the first control cable plug of the compact water manifold structure;

(b) a second flexible waterproof control cable having a first mated socket end and a second mated socket end, the first mated socket end of the second flexible waterproof control cable being in removable watertight mated engagement with a socket end of the second control cable plug; and (c) a second compact water manifold structure having a first control cable plug, the second mated socket end of the second flexible waterproof control cable being in removable watertight mated engagement with a socket end of the first control cable plug of the second compact water manifold structure.

3. The combination of claim 1, further comprising a second timer control cable plug electrically connected to the timer means.

4. The combination of claim 1, wherein each sprinkler head is an impact sprinkler head having an elongated spike for removable securement into the new lawn.

5. The combination of claim 1, wherein a 120 volt supply line of the timer means is electrically connected to a power source, the timer means being in approximate adjacency to the power source so that high voltage is disposed away from the new lawn, the timer means having a 24 volt output for low voltage above ground electrical passage along the flexible waterproof control cable.

6. The combination of claim 1, wherein the flexible waterproof control cable is formed of multi-stranded wires having a vinyl insulation outer casing and the first mated socket end and a second mated socket end are molded integral with the flexible waterproof control cable.

7. A portable knockdown above ground watering system for establishing a new lawn having area of approximately one acre, comprising:

(a) a plurality of compact water manifold structures, each compact water manifold structure comprising a manifold housing having a water inlet in fluid communication with a plurality of water outlets, a plurality of solenoid actuated valves connected adjacent to and in fluid communication with each of the water outlets, each solenoid actuated valve having a solenoid valve water outlet having threaded means for removable engagement with a first end of an outlet hose, the solenoid actuated valves being electrically connected to a first control cable plug, and an inlet hose connector connected in fluid communication with the water inlet for removable connection to an inlet hose, the inlet hose being removably connected to a water source, each of the compact water manifold structures being positionable on the new lawn so that a minimum length of outlet hoses are required;

(b) a plurality of sprinkler heads, each sprinkler head being removably connected to a second end of the outlet hose;

(c) a plurality of flexible waterproof control cables, each flexible waterproof control cable having a first mated socket end and a second mated socket end, the first mated socket end being in removable watertight mated engagement with a socket end of the first control cable plug; and (d) a plurality of timer assemblies for electronically regulating the solenoid actuated valves of each compact water manifold structure for operation of the sprinkler heads, each timer assembly being electrically connected to a timer control cable plug, the timer control cable plug having a timer socket end for removable watertight mated engagement with the second mated socket end of each flexible water proof control cable.

8. The system of claim 7, further comprising a second control cable plug electrically connected to the first control cable plug of one of the compact water manifold structures and a flexible waterproof control cable removably connected between the second control cable plug and the first control cable plug of another compact water manifold structure so that a single timer assembly can regulate both interconnected compact water manifold structures simultaneously when separate water sources are provided for each of these interconnected compact water manifold structures.

9. The system of claim 7, wherein each sprinkler head is an impact sprinkler head having an elongated spike for removable securement into the new lawn.

10. The system of claim 7, wherein a 120 volt supply line of each timer assembly is electrically connected to a power source, each timer assembly being in approximate adjacency to the power source so that high voltage is disposed away from the new lawn, each timer assembly having a 24 volt output for low voltage above ground electrical passage along each flexible waterproof control cable.

11. The system of claim 7, wherein each flexible waterproof control cable is formed of multi-stranded wires having a vinyl insulation outer casing and the first mated socket end and a second mated socket end are molded integral with the flexible waterproof control cable.

12. A portable compact low profile water manifold structure for inconspicuous ground level placement for use in an above ground watering system for establishing a new lawn, the water manifold comprising a manifold housing having a water inlet in fluid communication with a plurality of water outlets, a plurality of solenoid actuated valves connected adjacent to and in fluid communication with each of the water outlets, the solenoid actuated valves having a solenoid valve water outlet having threaded means for removable engagement with an outlet hose, the solenoid actuated valves being electrically connected to a first control cable plug, the first control cable plug having a socket end for removable watertight mated engagement with a mated socket end of a control cable, and an inlet hose connector connected in fluid communication with the water inlet for removable connection to an inlet hose.

13. The structure of claim 12, further comprising a second control cable plug electrically connected to the first control cable plug, the second control cable plug having a socket end for removable watertight mated engagement with a mated socket end of a second control cable.

14. The structure of claim 12, wherein the solenoid actuated valves include switching means for manually operating the valves.

* * * * *